(12) United States Patent
Schneider et al.

(10) Patent No.: US 11,765,596 B2
(45) Date of Patent: Sep. 19, 2023

(54) SECURITY PROCEDURE

(71) Applicant: Nokia Technologies Oy, Espoo (FI)

(72) Inventors: Peter Schneider, Holzkirchen (DE); Ranganathan Mavureddi Dhanasekaran, Munich (DE); Anja Jerichow, Grafing bei Munich (DE)

(73) Assignee: Nokia Technologies Oy, Espoo (FI)

( * ) Notice: Subject to any disclaimer, the term of this patent is extended or adjusted under 35 U.S.C. 154(b) by 72 days.

(21) Appl. No.: 17/159,380

(22) Filed: Jan. 27, 2021

(65) Prior Publication Data
US 2022/0046426 A1 Feb. 10, 2022

(30) Foreign Application Priority Data

Aug. 7, 2020 (EP) .................................... 20189967

(51) Int. Cl.
| | |
|---|---|
| *H04W 12/72* | (2021.01) |
| *H04W 56/00* | (2009.01) |
| *H04W 12/10* | (2021.01) |
| *H04W 12/069* | (2021.01) |

(52) U.S. Cl.
CPC ......... *H04W 12/72* (2021.01); *H04W 12/069* (2021.01); *H04W 12/10* (2013.01); *H04W 56/001* (2013.01); *H04W 56/003* (2013.01)

(58) Field of Classification Search
CPC .................... H04W 4/50–80; H04W 88/00–06
See application file for complete search history.

(56) References Cited

U.S. PATENT DOCUMENTS

| | | | | |
|---|---|---|---|---|
| 2005/0271209 | A1* | 12/2005 | Sahasrabudhe | ........... H04L 9/12 380/270 |
| 2008/0077976 | A1* | 3/2008 | Schulz | ................. H04L 9/3249 726/5 |
| 2009/0267730 | A1* | 10/2009 | Zhang | ................... H04L 9/3273 340/5.8 |

(Continued)

OTHER PUBLICATIONS

"3rd Generation Partnership Project; Technical Specification Group Services and System Aspects; Study on authentication enhancements in 5G System; (Release 16)", 3GPP TR 33.846, V0.6.0, May 2020, pp. 1-25.

(Continued)

*Primary Examiner* — San Htun
(74) *Attorney, Agent, or Firm* — Laine IP Oy

(57) ABSTRACT

In accordance with an example embodiment, there is provided an apparatus, such as a user equipment, configured to receive, from a communication network, an authentication request which comprises a nonce and a received sequence number, check, whether the received sequence number is advanced with respect to a first sequence number, the first sequence number being from a most recent previous authentication request handled by the apparatus, check, responsive to the received sequence number not being advanced with respect the first sequence number, whether the nonce is identical to one from among plural stored nonces, and send, responsive to the nonce being identical to the one stored nonce, a response to the authentication request which comprises as a synchronization failure token a dummy value which is not derived from the first sequence number.

21 Claims, 5 Drawing Sheets

(56) References Cited

U.S. PATENT DOCUMENTS

| | | | | |
|---|---|---|---|---|
| 2013/0125114 A1* | 5/2013 | Frascadore | ......... | H04L 41/0816 718/1 |
| 2013/0310006 A1* | 11/2013 | Chen | ..................... | H04W 12/04 455/411 |
| 2016/0165649 A1* | 6/2016 | Polo | ........................ | H04W 4/80 455/411 |
| 2018/0091565 A1* | 3/2018 | Arsenault | ............... | H04L 67/02 |

OTHER PUBLICATIONS

"3rd Generation Partnership Project; Technical Specification Group Services and System Aspects; 3G Security Security architecture (Release 16)", 3GPP TS 33.102, V16.0 0, Jul. 2020, pp. 1-77.

"3rd Generation Partnership Project; Technical Specification Group Services and System Aspects; Security architecture and procedures for 5G system (Release 16)", 3GPP TS 33.501, V16.3.0, Jul. 2020, pp. 1-248.

Borgaonkar et al., "New Privacy Threat on 3G, 4G, and Upcoming 5G AKA Protocols", Proceedings on Privacy Enhancing Technologies, vol. 3, 2019, pp. 108-127.

Extended European Search Report received for corresponding European Patent Application No. 20189967.1, dated Jan. 14, 2021, 8 pages.

"Conclusion on KI #4.1", 3GPP TSG-SA WG3 Meeting #97, S3-194169, Agenda : 8.11, Huawei, Nov. 18-22, 2019, 2 pages.

"SQN protection during re-synchronisation procedure in AKA", 3GPP TSG-SA3 Meeting #100e, S3-202098, Agenda 5.6, Nokia, Aug. 17-28, 2020, 4 pages.

\* cited by examiner

SECURITY PROCEDURE

FIELD

The present disclosure pertains to security management in a communication system.

BACKGROUND

Before a user equipment accesses resources through a communication network, such as, for example, a wireless communication network, an authentication procedure may be performed between the user equipment and the communication network, to ensure the user equipment is subscribed to the network, or with a network with which the communication network has a roaming arrangement. Also the network may be authenticated in addition to the user equipment.

Authentication procedures may be based on cryptographic methods, for example, that ensure both the identity of the subscriber and non-repudiation in case billing or protected content is to be communicated through the communication network. As sensitive content, such as identity information, may be exchanged already during the authentication procedure, this procedure should be performed in a way that doesn't disclose personal information of the user even to maliciously configured networks.

SUMMARY

According to some aspects, there is provided the subject-matter of the independent claims. Some example embodiments are defined in the dependent claims.

The scope of protection sought for various example embodiments of the invention is set out by the independent claims. The example embodiments and features, if any, described in this specification that do not fall under the scope of the independent claims are to be interpreted as examples useful for understanding various example embodiments of the invention.

According to a first aspect of the present invention, there is provided an apparatus comprising at least one processing core, at least one memory including computer program code, the at least one memory and the computer program code being configured to, with the at least one processing core, cause the apparatus at least to receive, from a communication network, an authentication request which comprises a nonce and a received sequence number, check, whether the received sequence number is advanced with respect to a first sequence number, the first sequence number being from a most recent previous authentication request handled by the apparatus, check, responsive to the received sequence number not being advanced with respect the first sequence number, whether the nonce is identical to one from among plural stored nonces, and send, responsive to the nonce being identical to the one stored nonce, a response to the authentication request which comprises as a synchronization failure token a preconfigured dummy value which is not derived from the first sequence number.

According to a second aspect of the present invention, there is provided a method comprising receiving, in an apparatus, from a communication network, an authentication request which comprises a nonce and a received sequence number, checking, whether the received sequence number is advanced with respect to a first sequence number, the first sequence number being from a most recent previous authentication request handled by the apparatus, checking, responsive to the received sequence number not being advanced with respect the first sequence number, whether the nonce is identical to one from among plural stored nonces, and sending, responsive to the nonce being identical to the one stored nonce, a response to the authentication request which comprises as a synchronization failure token a preconfigured dummy value which is not derived from the first sequence number.

According to a third aspect of the present invention, there is provided an apparatus comprising at least one processing core, at least one memory including computer program code, the at least one memory and the computer program code being configured to, with the at least one processing core, cause the apparatus at least to send, to a user equipment, an authentication request which comprises a first nonce and a first sequence number, receive a synchronization failure message as a response to the authentication request, the synchronization failure message comprising as a synchronization failure token a preconfigured dummy value, and responsive to the synchronization failure token comprising the dummy value, send a new authentication request to the user equipment, the new authentication request comprising a second nonce and a second sequence number, the second nonce being different from the first nonce.

According to a fourth aspect of the present invention, there is provided a method, comprising sending, to a user equipment, an authentication request which comprises a first nonce and a first sequence number, receiving a synchronization failure message as a response to the authentication request, the synchronization failure message comprising as a synchronization failure token a preconfigured dummy value, and responsive to the synchronization failure token comprising the dummy value, sending a new authentication request to the user equipment, the new authentication request comprising a second nonce and a second sequence number, the second nonce being different from the first nonce.

According to a fifth aspect of the present invention, there is provided an apparatus comprising means for receiving, in the apparatus, from a communication network, an authentication request which comprises a nonce and a received sequence number, checking, whether the received sequence number is advanced with respect to a first sequence number, the first sequence number being from a most recent previous authentication request handled by the apparatus, checking, responsive to the received sequence number not being advanced with respect the first sequence number, whether the nonce is identical to one from among plural stored nonces, and sending, responsive to the nonce being identical to the one stored nonce, a response to the authentication request which comprises as a synchronization failure token a preconfigured dummy value which is not derived from the first sequence number.

According to a sixth aspect of the present invention, there is provided an apparatus comprising means for sending, to a user equipment, an authentication request which comprises a first nonce and a first sequence number, receiving a synchronization failure message as a response to the authentication request, the synchronization failure message comprising as a synchronization failure token a preconfigured dummy value, and responsive to the synchronization failure token comprising the dummy value, sending a new authentication request to the user equipment, the new authentication request comprising a second nonce and a second sequence number, the second nonce being different from the first nonce.

According to a seventh aspect of the present invention, there is provided a non-transitory computer readable medium having stored thereon a set of computer readable instructions that, when executed by at least one processor, cause an apparatus to at least perform receiving, in an apparatus, from a communication network, an authentication request which comprises a nonce and a received sequence number, checking, whether the received sequence number is advanced with respect to a first sequence number, the first sequence number being from a most recent previous authentication request handled by the apparatus, checking, responsive to the received sequence number not being advanced with respect the first sequence number, whether the nonce is identical to one from among plural stored nonces, and sending, responsive to the nonce being identical to the one stored nonce, a response to the authentication request which comprises as a synchronization failure token a preconfigured dummy value which is not derived from the first sequence number.

According to an eighth aspect of the present invention, there is provided a non-transitory computer readable medium having stored thereon a set of computer readable instructions that, when executed by at least one processor, cause an apparatus to at least perform sending, to a user equipment, an authentication request which comprises a first nonce and a first sequence number, receiving a synchronization failure message as a response to the authentication request, the synchronization failure message comprising as a synchronization failure token a preconfigured dummy value, and responsive to the synchronization failure token comprising the dummy value, sending a new authentication request to the user equipment, the new authentication request comprising a second nonce and a second sequence number, the second nonce being different from the first nonce.

According to a ninth aspect of the present invention, there is provided a computer program configured to cause an apparatus to perform at least the following, when run on a computer: receiving, in an apparatus, from a communication network, an authentication request which comprises a nonce and a received sequence number, checking, whether the received sequence number is advanced with respect to a first sequence number, the first sequence number being from a most recent previous authentication request handled by the apparatus, checking, responsive to the received sequence number not being advanced with respect the first sequence number, whether the nonce is identical to one from among plural stored nonces, and sending, responsive to the nonce being identical to the one stored nonce, a response to the authentication request which comprises as a synchronization failure token a preconfigured dummy value which is not derived from the first sequence number.

According to a tenth aspect of the present invention, there is provided a computer program configured to cause an apparatus to perform at least the following, when run on a computer: sending, to a user equipment, an authentication request which comprises a first nonce and a first sequence number, receiving a synchronization failure message as a response to the authentication request, the synchronization failure message comprising as a synchronization failure token a preconfigured dummy value, and responsive to the synchronization failure token comprising the dummy value, sending a new authentication request to the user equipment, the new authentication request comprising a second nonce and a second sequence number, the second nonce being different from the first nonce.

BRIEF DESCRIPTION

EMBODIMENTS

In accordance with methods laid out herein, an improved authentication mechanism may be obtained which prevents the risk of leaking personal information of the user. In detail, a malicious network entity, such as base station or authentication server, is thwarted by maintaining a stored plurality of nonces, and in case a repeat of a same nonce is detected, a response is generated based on a preconfigured dummy value, rather than a sequence number maintained in a user equipment.

Figure 1:
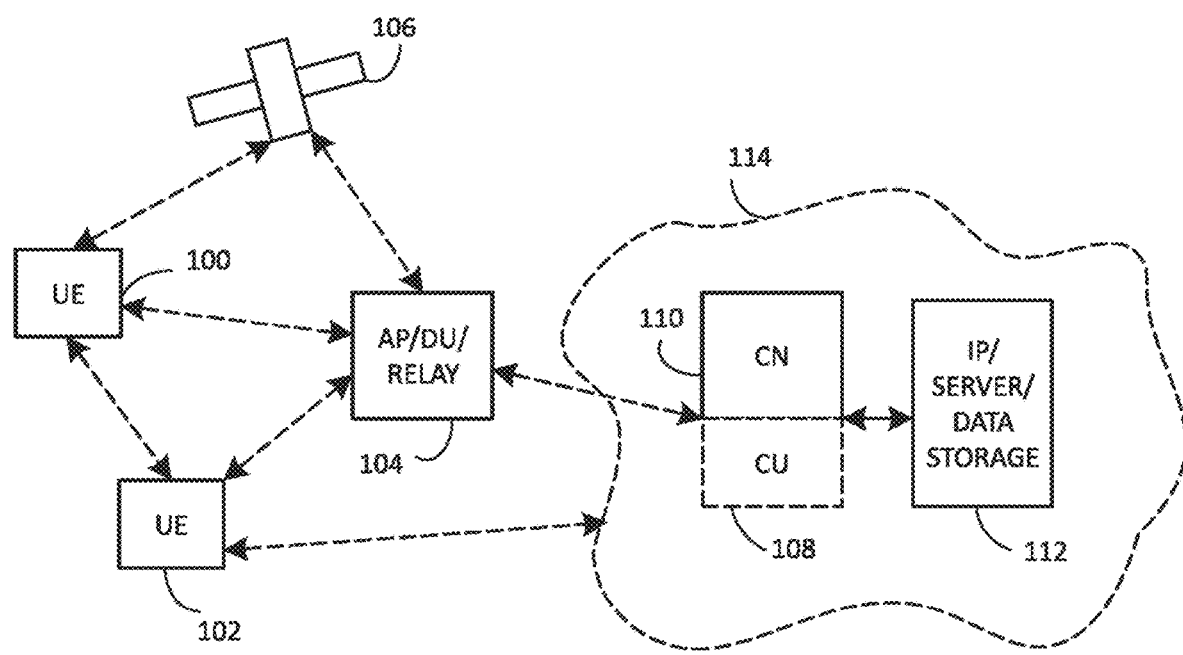
FIG. 1 illustrates an example system in accordance with at least some embodiments.

FIG. 1 illustrates an example system in accordance with at least some embodiments. In the following, different exemplifying embodiments will be described using, as an example of an access architecture to which the embodiments may be applied, a radio access architecture based on long term evolution advanced (LTE Advanced, LTE-A) or new radio (NR), also known as fifth generation (5G), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1. The embodiments are not, however, restricted to the system given as an example but a person skilled in the art may apply the solution to other communication systems provided with necessary properties. Examples of such other communication systems include microwave links and optical fibers, for example.

The example of FIG. 1 shows a part of an exemplifying radio access network. FIG. 1 shows user devices 100 and 102 configured to be in a wireless connection on one or more communication channels in a cell with an access node (such as (e/g)NodeB) 104 providing the cell. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage. A communications system typically comprises more than one (e/g)NodeB in which case the (e/g)NodeBs may also be configured to communicate with one another over links, wired or wireless, designed for the purpose. These links may be used for signalling purposes. The (e/g)NodeB is a computing device configured to control the radio resources of the communication system it is coupled to. The NodeB may also be referred to as a base station, an access point or any other type of interfacing device including a relay station such as DU (distributed unit) part of IAB (integrated access and backhaul) node capable of operating in a wireless environment. The DU part may facilitate the gNB functionalities of the IAB node. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, also including a relay node. An example of such scenario is MT (mobile termination) part of IAB node, which provides the backhaul connection for the IAB node.

The user device, or user equipment, typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction.

Various techniques described herein may also be applied to a cyber-physical system (CPS) (a system of collaborating computational elements controlling physical entities). CPS may enable the implementation and exploitation of massive amounts of interconnected IoT devices (sensors, actuators, processors, microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented inside these apparatuses, to enable the functioning thereof.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being integratable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is distributed in the radio and centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

It should also be understood that the distribution of labour between core network operations and base station operations may differ from that of the LTE or even be non-existent. Some other technology advancements, such as Big Data and all-IP, may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilise geostationary earth orbit (GEO) satellite systems, but also low earth orbit (LEO) satellite systems, in particular mega-constellations (systems in which hundreds of (nano)satellites are deployed). Each satellite 106 in the constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. A cellular radio system may be implemented as a multilayer network including several kinds of cells, such as macrocells, microcells and picocells, for example. Typically, in multilayer networks, one access node provides one kind of a cell or cells, and thus a plurality of (e/g)NodeBs are required to provide such a network structure.

In unlicensed-band NR operation, a bandwidth part, BWP, may comprise plural sub-bands separated from each other by guard bands. The sub-bands may be, but need not be, 20 MHz wide, for example. Operation on the BWP may proceed based on sub-band specific listen-before talk, LBT, operation. In LBT, a node desiring to use a spectrum resource will listen on the resource before using it, and only proceed to transmit on the resource in case the listening indicates the resource appears to be free, that is, not currently in use. Simultaneous use of the same resource by plural transmitters leads to interference and decreased quality of communication on the resource.

A bandwidth part, BWP, is a contiguous set of physical resource blocks, PRBs, on a given carrier. A carrier bandwidth may be 40 MHz, 80 MHz or 160 MHz, for example. These PRBs are selected from a contiguous subset of the usable common resource blocks for a given numerology on a carrier. A BWP may be characterized by the following features: subcarrier spacing, SCS, sub-band number and sub-band bandwidth. SCS may take values such as 15 kHz, 30 kHz or 60 kHz, for example. A carrier may comprise 2, 3, 4, 5 or 8 sub-bands of 20-MHz bandwidth, for example. A PRB may have 12 subcarriers, for example. Likewise, a normal scheduling unit in time (known as a slot) may be 12 or 14 OFDM symbols long. Furthermore, NR supports mini-slot based operation with the scheduling unit in time smaller than one slot, for example 2, 4 or 7 OFDM symbols. In 5G, the PRB may be both 12 subcarriers wide and 14 OFDM symbols long, assuming normal cyclic prefix. A transmission bandwidth, TX BW, is a part of the spectrum on which a base node actually transmits following the listening phase of LBT of a sub-band specific LBT process. The TX BW may be the entire bandwidth of BWP, or a portion thereof, in dependence of a result of the listening phase.

Figure 2:
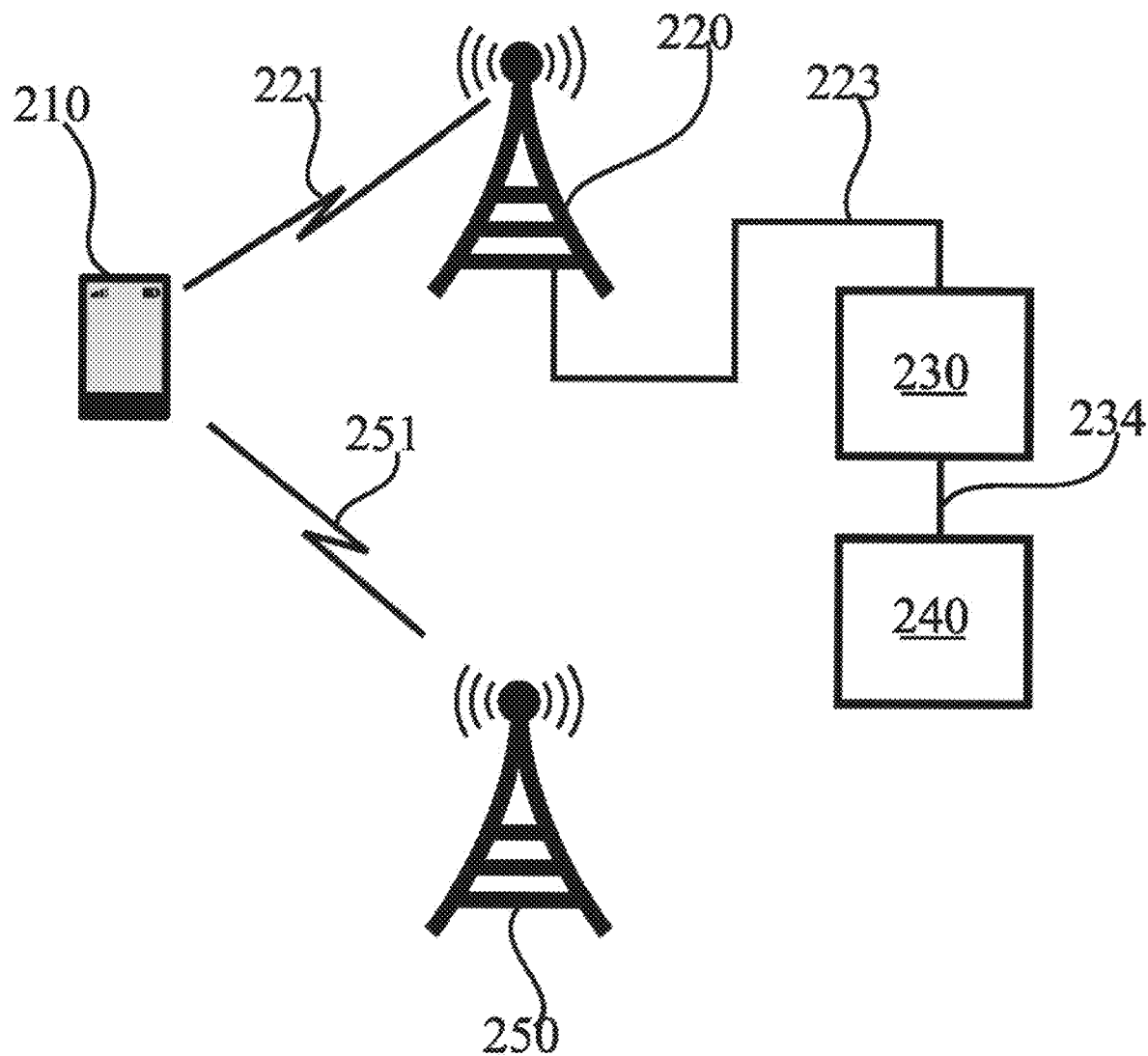
FIG. 2 illustrates an example system in accordance with at least some embodiments.

FIG. 2 illustrates an example system in accordance with at least some embodiments. In the system of FIG. 2, user equipment, UE, 210, which may correspond to the UE 100 or 102 of FIG. 1, is arranged to wirelessly communicate with base stations. A "base station" is a terminological choice made herein which is not meant to limit the scope of applicability of the present disclosure, rather, while it is understood that a radio node of a network may be known as, for example, an access point rather than a base station, the expression "base station" is used herein, by which it is not meant to exclude technologies where the term "access point" is more commonly used.

Base station 220 is comprised in a communication network, which in the example of FIG. 2 is a wireless communication network, such as a cellular communication network, for example. Examples of cellular communication networks include third generation, fourth generation and fifth generation cellular networks, as specified by the third generation partnership project, 3GPP, for example. Other examples of wireless communication networks are non-cellular networks, such as wireless local area networks, WLANs. A communication network may alternatively be based on wire-line connections rather than wireless connections.

Base station 220 is connected, via connection 223, with a core network device 230. Core network device 230 is further connected, via connection 234, with gateway 240. Core network device 230 may comprise an authentication server, for example, or a physical network entity performing more than one functional role. Such roles may comprise an authentication server function, a mobility management entity, MME, function and/or a 5G access and mobility management function, AMF, for example. Gateway 240 may be configured to provide access from the cellular network to further networks, such as the Internet, for example.

UE 210 is connected to base station 220 via wireless link 221. Wireless link 221 may comprise an uplink for conveying information from UE 210 to base station 220, and a downlink for conveying information from base station 220 to UE 210. To attach to the communication network, UE 210 may be configured to perform an authentication process with the communication network, over wireless link 221.

Authentication between UE 210 and a communication network, such as third generation, fourth generation and fifth generation mobile networks, for example, may be based on an authentication request sent from the network to the UE, where the authentication request comprises a random nonce.

A nonce is an expression used herein to represent a value, number of bit string that is to be generated using a random process. The request may further comprise information by which the network proves it has a secret shared between the communication network and UE 210. For example, in the UE the shared secret may reside in a universal subscriber identity module, USIM. Depending on the embodiment, the UE 210 may store the secret in a different kind of secure location as well, and not necessarily in an USIM. In addition, the authentication request may comprise a sequence number, which is maintained per subscription in the network and which is incremented by the network for each authentication procedure performed for this particular subscription, which is in the example of FIG. 2 associated with UE 210. In general, the sequence number may be advanced, which may in a strict sense comprise incrementing or decrementing the numerical value of the sequence number, as long as the UE and the network are configured to interoperate they will know which way the sequence number advances at each increment. In general, the sequence number may be advanced in accordance with a preconfigured advancement rule. The sequence number may be passed in encrypted or unencrypted form and allows the UE 210, for example the USIM, to verify that the authentication request is fresh, that is, it is not older than a previous authentication request that the UE has received.

When UE 210 receives an authentication request that is not fresh, in other words where the sequence number of the request is not advanced with respect to a most recent previous authentication request processed by the UE, UE 210 may be configured to respond with a synchronization failure message that contains an authentication token for synchronization failure, AUTS. AUTS is thus an example of a synchronization failure token. In general, a synchronization failure token is an information token used to inform the network of synchronization failure event, that is, that the sequence number in the authentication request is not advanced with respect to the most recent previous authentication. The synchronization failure token, such as an AUTS, may contain in encrypted form the sequence number that is maintained by the UE, which may be interpreted as the lowest sequence number value that UE 210 is willing to accept (or the highest one if the sequence number is advanced by decrementing it). In general, the least advanced sequence number the UE is willing to accept may be included in the synchronization failure token. Moreover, the synchronization failure token may contain a message authentication code that proves that the token was really computed by the UE and has not been tampered with. This code may comprise a cryptographic signature of UE 210, computed over the synchronization failure message, for example. In case the network receives a valid synchronization failure token, such as an AUTS, it may adapt, or "synchronize", its own sequence number value to the one received from the UE in the synchronization failure message which conveys the synchronization failure token.

The encryption of the sequence number value within the synchronization failure token may use a simple form of encryption, such a XOR operation, for example. In detail, the sequence number may be XOR'ed with a key AK (Anonymity key), where AK may depend on the nonce and, optionally, a long-term key K of the subscription. When different sequence numbers are encrypted with the same AK, information about the clear-text sequence numbers may be derived from the encrypted sequence number values. It has been shown that an attacker with a spoofed base station 250 can repeatedly replay, over wireless link 251, one authentication request and trick UE 210 into protecting different sequence numbers with the same AK, resulting from using the same nonce in the replayed authentication requests. Thus, the attacker may be able to derive at least some bits of a sequence number transmitted in a synchronization failure token, by replaying previously captured authentication requests to UE 210. The exact number of bits the attacker may be able to access depends on various factors, including the effort the attacker is willing to make, and the length of time UE 210 remains within a coverage of the attacker's spoofed base station 250. In simulations, it appears that the attacker may be able to obtain 8 to 10 bits of the sequence number. If this attack is carried out against one UE 210 twice, the attacker may get the least significant bits of two different sequence numbers used at the two points in time. When the increase in the sequence number between the two points in time changes only the bits the attacker could uncover, the attacker may learn the difference between the two sequence numbers.

Different schemes are known, how the network can advance the sequence number. Depending on the scheme that is used, it may be possible to conclude from the difference between two sequence number values that have been used at times Ta and Tb, how many authentication procedures have been executed with the UE between times Ta and Tb. This in turn may enable derivation of information concerning service usage of UE 210 during the time interval from Ta to Tb, since authentication processes may be triggered in connection with using certain services. This is private information that should not be leaked to attackers. Therefore, the sequence number should remain secret.

To prevent attackers from inferring information on the sequence number, previously used nonces may be stored for reference. For example, a USIM comprised in UE 210 may be configured to store nonces used in the past, for example those nonces which have been used to generate synchronization failure tokens. Alternatively, the nonces may be stored in a random access memory of UE 210, or in a storage external to UE 210, to which UE 210 can refer to determine whether a nonce is a repeated nonce. In the event UE 210 needs to compute a new synchronization failure token, it may check if the current nonce is identical to a nonce in the storage. If this is the case, then the authentication request being processed has a nonce repetition. UE 210 may be configured to not compute the synchronization failure token with this repeated nonce value, but instead to set the synchronization failure token to all zeros, or to another preconfigured dummy value. No information of the current sequence number is thus revealed by such a dummy synchronization failure token.

On the network side, when a synchronization failure token is received, the network may check whether the synchronization failure token is equal to the preconfigured dummy value. In this case, the network does not adapt its current sequence number, as there is no sequence number value contained in the dummy synchronization failure token. Responsive to the dummy synchronization failure token, the network reacts as specified currently for the case where the synchronization failure token contains a sequence number that does not require the network's sequence number to be adapted, that is, the network sends a new authentication challenge, with a newly generated nonce, to the UE 210.

As UE 210 can only store a finite number of nonces, the storage will become full at some time. In this case, UE 210 may be configured to discard the oldest nonce when it needs room for a new nonce. It is sufficient to have storage for a limited number of nonces, such as 10 or 100, for example, to make known attacks on sequence number confidentiality substantially more difficult for attackers.

In normal use, it is highly unlikely that two authentication requests which cause a synchronization failure will have the same nonce, since networks which are implemented in practice require good random or pseudorandom number generators. Using such generators greatly reduces to likelihood that a same nonce is produced in rapid succession. Should this happen all the same, authentication requests as described herein will not lead to a synchronization of the sequence number, merely to a time delay corresponding to the authentication request-response roundtrip time. A new challenge will merely to be sent to the UE 210. Other benefits of the described solution include that no further cryptographic operations are needed compared to the normal use case, and implementing the disclosed mechanism required only modest technical modifications of UE and network behaviour. The disclosed solution may be used in fifth generation, fourth generation and third generation cellular networks as well as in non-cellular networks which use UE authentication.

In some embodiments, UE 210 is configured to store a nonce and, associated with the nonce, an indication of a location, where the nonce was used to send a synchronization failure token. In these embodiments, UE 210 may be configured to send the dummy synchronization failure token only in case an authentication request fails synchronization, comprises a repeat nonce and UE 210 is at most within a predetermined distance from the location, where the nonce was previously used to generate a synchronization failure token. This provides the benefit, that unnecessary use of the dummy value may be avoided, and the associated delay avoided, in case UE 210 is so distant from the previous location where the repeat nonce was used, that it is unlikely to be within communication range of spoofed base station 250. In case the location is stored in an USIM in the UE, the USIM may request the location from a positioning functionality of the UE, in connection with the storing and when discovering a repeat nonce.

Figure 3:
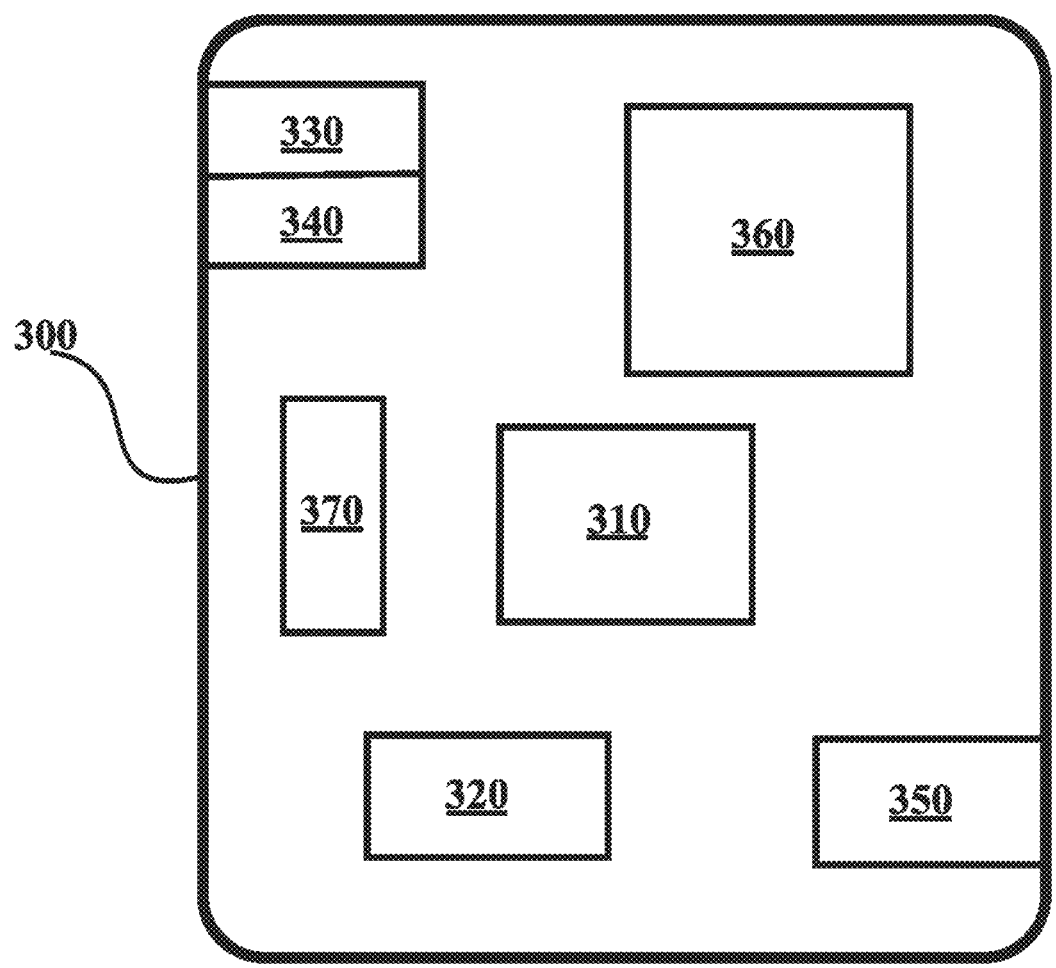
FIG. 3 illustrates an example apparatus capable of supporting at least some embodiments of the present invention.

FIG. 3 illustrates an example apparatus capable of supporting at least some embodiments of the present invention. Illustrated is device 300, which may comprise, for example, in suitable parts, a mobile communication device such as user equipment or network node FIG. 1 or FIG. 2. Comprised in device 300 is processor 310, which may comprise, for example, a single- or multi-core processor wherein a single-core processor comprises one processing core and a multi-core processor comprises more than one processing core. Processor 310 may comprise, in general, a control device. Processor 310 may comprise more than one processor. Processor 310 may be a control device. A processing core may comprise, for example, a Cortex-A8 processing core manufactured by ARM Holdings or a Steamroller processing core designed by Advanced Micro Devices Corporation. Processor 310 may comprise at least one Qualcomm Snapdragon and/or Intel Atom processor. Processor 310 may comprise at least one application-specific integrated circuit, ASIC. Processor 310 may comprise at least one field-programmable gate array, FPGA. Processor 310 may be means for performing method steps in device 300, such as receiving, checking and sending, for example. Processor 310 may be configured, at least in part by computer instructions, to perform actions.

A processor may comprise circuitry, or be constituted as circuitry or circuitries, the circuitry or circuitries being configured to perform phases of methods in accordance with embodiments described herein. As used in this application, the term "circuitry" may refer to one or more or all of the following: (a) hardware-only circuit implementations, such as implementations in only analog and/or digital circuitry, and (b) combinations of hardware circuits and software, such as, as applicable: (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Device 300 may comprise memory 320. Memory 320 may comprise random-access memory and/or permanent memory. Memory 320 may comprise at least one RAM chip. Memory 320 may comprise solid-state, magnetic, optical and/or holographic memory, for example. Memory 320 may be at least in part accessible to processor 310. Memory 320 may be at least in part comprised in processor 310. Memory 320 may be means for storing information. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions. Memory 320 may be at least in part comprised in processor 310. Memory 320 may be at least in part external to device 300 but accessible to device 300.

Device 300 may comprise a transmitter 330. Device 300 may comprise a receiver 340. Transmitter 330 and receiver 340 may be configured to transmit and receive, respectively, information in accordance with at least one cellular or non-cellular standard. Transmitter 330 may comprise more than one transmitter. Receiver 340 may comprise more than one receiver. Transmitter 330 and/or receiver 340 may be configured to operate in accordance with global system for mobile communication, GSM, wideband code division multiple access, WCDMA, 5G, long term evolution, LTE, IS-95, wireless local area network, WLAN, Ethernet and/or worldwide interoperability for microwave access, WiMAX, standards, for example.

Device 300 may comprise a near-field communication, NFC, transceiver 350. NFC transceiver 350 may support at least one NFC technology, such as NFC, Bluetooth, Wibree or similar technologies.

Device 300 may comprise user interface, UI, 360. UI 360 may comprise at least one of a display, a keyboard, a touchscreen, a vibrator arranged to signal to a user by causing device 300 to vibrate, a speaker and a microphone. A user may be able to operate device 300 via UI 360, for example to accept incoming telephone calls, to originate telephone calls or video calls, to browse the Internet, to manage digital files stored in memory 320 or on a cloud accessible via transmitter 330 and receiver 340, or via NFC transceiver 350, and/or to play games.

Device 300 may comprise or be arranged to accept a user identity module 370. User identity module 370 may comprise, for example, a subscriber identity module, SIM, card installable in device 300. A user identity module 370 may comprise information identifying a subscription of a user of device 300. A user identity module 370 may comprise cryptographic information usable to verify the identity of a user of device 300 and/or to facilitate encryption of communicated information and billing of the user of device 300 for communication effected via device 300.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively to a serial bus, the transmitter may comprise a parallel bus transmitter. Likewise processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively to a serial bus, the receiver may comprise a parallel bus receiver.

Device 300 may comprise further devices not illustrated in FIG. 3. For example, where device 300 comprises a smartphone, it may comprise at least one digital camera. Some devices 300 may comprise a back-facing camera and a front-facing camera, wherein the back-facing camera may be intended for digital photography and the front-facing camera for video telephony. Device 300 may comprise a fingerprint sensor arranged to authenticate, at least in part, a user of device 300. In some embodiments, device 300 lacks at least one device described above. For example, some devices 300 may lack a NFC transceiver 350 and/or user identity module 370.

Processor 310, memory 320, transmitter 330, receiver 340, NFC transceiver 350, UI 360 and/or user identity module 370 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the embodiment various ways of interconnecting at least two of the aforementioned devices may be selected without departing from the scope of the present invention.

Figure 4:
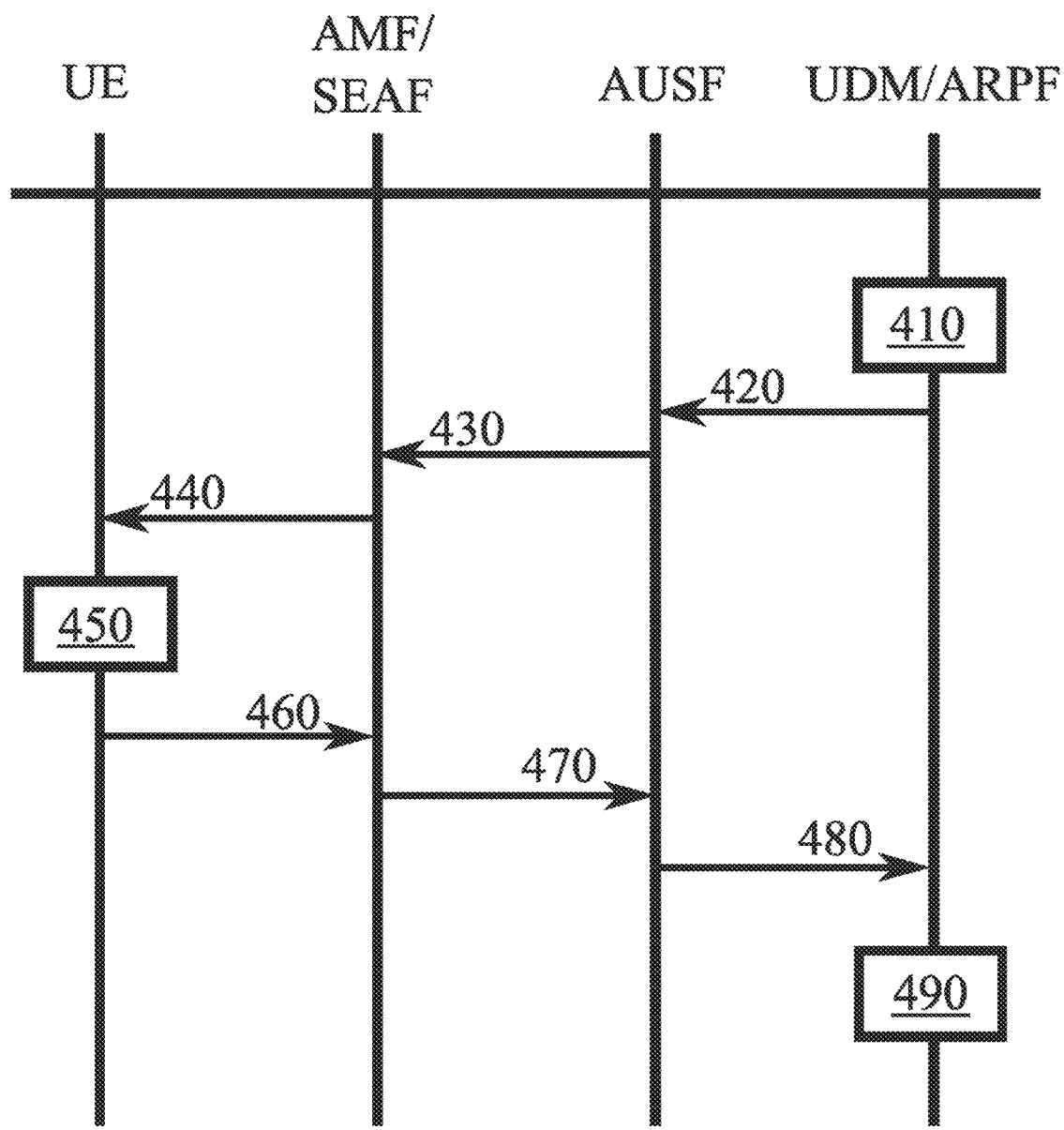
FIG. 4 illustrates signaling in accordance with at least some embodiments of the present invention

FIG. 4 illustrates signaling in accordance with at least some embodiments of the present invention. On the vertical axes are disposed, from the left to the right, user equipment UE, access and mobility management function AMF and/or a security anchor functionality SEAF, an authentication server function AUSF, and finally on the right a unified data management, UDM, node running an authentication credential repository and processing function, ARPF.

In phase 410, an authentication vector is generated during an authentication procedure in the UDM/ARPF. The authentication vector may comprise the sequence number and the nonce, for example. In phase 420 the UDM/ARPF signals to the AUSF, this message comprising the sequence number and the nonce. The message of phase 420 may comprise a 5G Home Environment Authentication vector, for example. The message may be named an Nudm_UEAuthentication_Get Response, for example.

In phase 430, the AUSF signals to AMF/SEAF with a message, named, for example, Nausf_UEAuthentication_Authenticate Response comprising the sequence number and the nonce, for example in a 5G Serving Environment Authentication vector. In response, AMF/SEAF sends an authentication request message to the UE in phase 440. The authentication request comprises the nonce and the sequence number, as described herein above.

In phase 450 the UE processes the authentication request it received in phase 440. In detail, in case there is no synchronization failure, that is, when the received sequence number is advanced with respect to a first sequence number, the first sequence number being from a most recent previous authentication request handled by the UE, the UE computes an answer and responds according to a normal successful authentication process. However, in case there is a synchronization failure, that is, when the received sequence number isn't advanced with respect to the first sequence number, the UE checks whether the nonce is identical to one from among the stored nonces. If the nonce is not identical to one of the stored nonces, the UE will store the nonce among the stored nonces and send a response comprising an encrypted version of the sequence number as maintained in the UE, that being the synchronization failure token, as described herein above. That is, the synchronization failure token is not based on the sequence number received in the authentication request but on the sequence number as maintained in the UE. Otherwise, if the nonce is identical to one of the stored nonces, the UE sends the response with the preconfigured dummy value as synchronization failure token to prevent an attacker from inferring elements of the sequence number as maintained in the UE.

In at least some embodiments, only nonces of authentication requests that result in a synchronization failure are stored by the UE. The number of nonces the UE stores may be configured. In case the nonces are stored in USIM, the choice of how many nonces to store affects only the USIM. The USIM may be configured to discard the oldest stored nonce in case there is otherwise no more room to store a new nonce. In case the location is stored in connection with the nonce, an USIM may request the location from a positioning functionality of the UE.

In phase 460, the UE sends the synchronization failure token to AMF/SEAF. In phase 470, the AMF/SEAF indicates the synchronization failure token to AUSF, and in phase 480 the AUSF provides the synchronization failure token to UDM/ARPF.

In phase 490, the UDM/ARPF checks if the synchronization failure token is identical with the preconfigured dummy value. If this is the case, the UDM/ARPF initiates a new authentication challenge with a new nonce, as in phase 410, and does not synchronize its sequence number based on the synchronization failure token. In case the synchronization failure token differs from the preconfigured dummy token, the UDM/ARPF synchronizes with the sequence number in the synchronization failure token to proceed with the authentication process.

At least some, and in some embodiments all, of the network nodes of FIG. 4 may be in a single physical node, such as core network device 230 of FIG. 2, for example.

Figure 5:
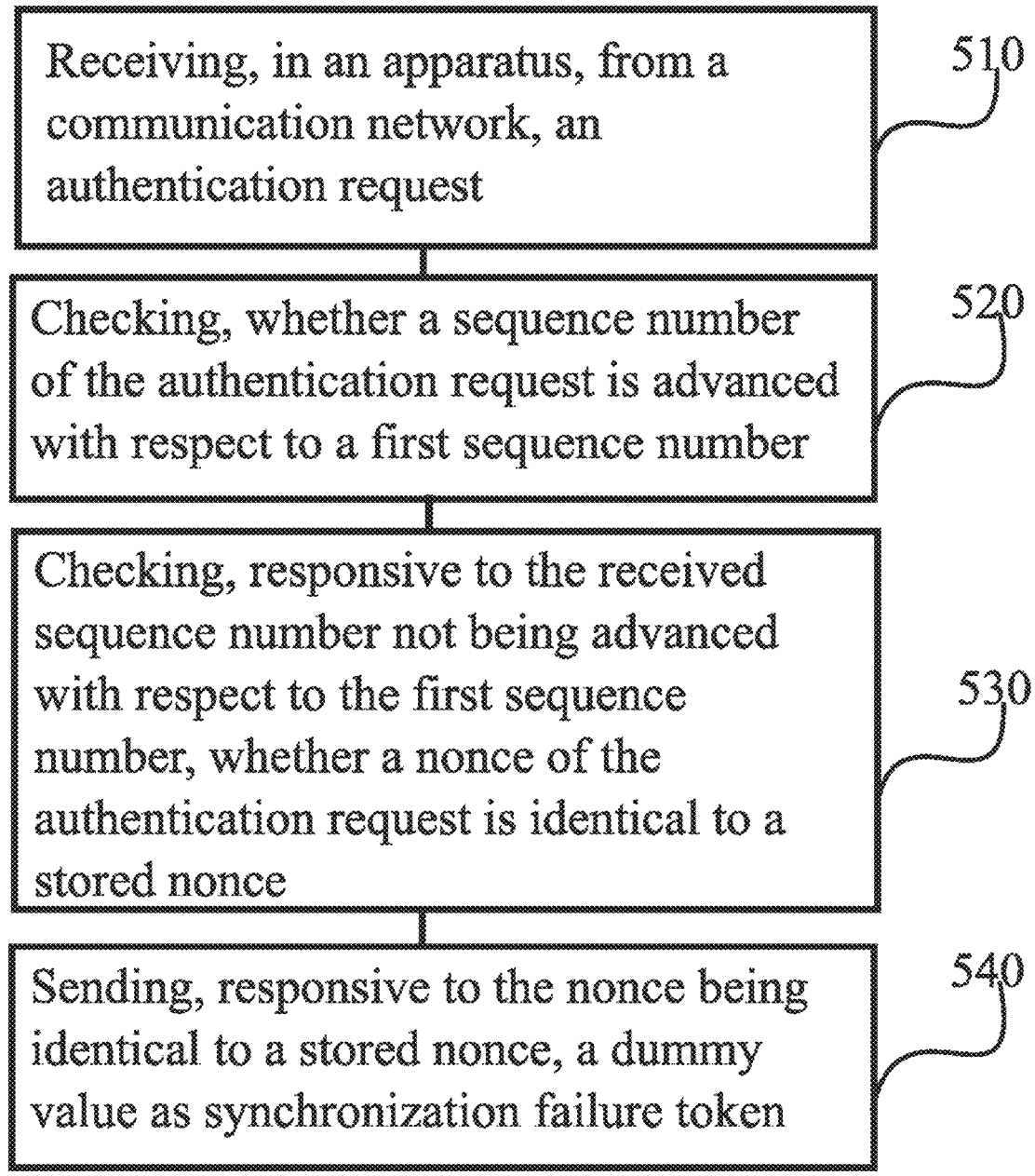
FIG. 5 is a flow graph of a method in accordance with at least some embodiments of the present invention.

FIG. 5 is a flow graph of a method in accordance with at least some embodiments of the present invention. The method may be performed in user equipment 210, or a control device installed therein, to control the functioning thereof, for example.

Phase 510 comprises receiving, in an apparatus, from a communication network, an authentication request which comprises a nonce and a received sequence number. Phase 520 comprises checking, whether the received sequence number is advanced with respect to a first sequence number, the first sequence number being from a most recent previous authentication request handled by the apparatus. Phase 530 comprises checking, responsive to the received sequence number not being advanced with respect the first sequence number, whether the nonce is identical to one from among plural stored nonces. Finally, phase 540 comprises sending, responsive to the nonce being identical to the one stored nonce, a response to the authentication request which comprises as a synchronization failure token a dummy value which is not derived from the first sequence number. By being not derived from the first sequence number, it is meant the UE does not produce the dummy value in a mathematical process which takes the first sequence number as an input. In other words, the dummy value is independent of the first sequence number.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in network security processing.

| REFERENCE SIGNS LIST | |
|---|---|
| 100, 102, 210 | User equiment |
| 104 | Access point/distributed unit |
| 108 | Centralized unit |
| 110 | Core network |
| 112 | Server/Data storage |
| 114 | Cloud |
| 220 | Base station |
| 250 | Spoofed base station |
| 230 | Core network device |
| 240 | Gateway |
| 221, 251 | Wireless links |
| 223, 234 | Connections |
| 300-370 | Structure of the device of FIG. 3 |
| 410-490 | Phases of the process of FIG. 4 |
| 510-540 | Phases of the process of FIG. 5 |

TECHNICAL CLAUSES

Clause 1. An apparatus comprising at least one processing core, at least one memory including computer program code, the at least one memory and the computer program code being configured to, with the at least one processing core, cause the apparatus at least to:
  receive, from a communication network, an authentication request which comprises a nonce and a received sequence number;
  check, whether the received sequence number is advanced with respect to a first sequence number, the first sequence number being from a most recent previous authentication request handled by the apparatus;
  check, responsive to the received sequence number not being advanced with respect the first sequence number, whether the nonce is identical to one from among plural stored nonces, and
  send, responsive to the nonce being identical to the one stored nonce, a response to the authentication request which comprises as a synchronization failure token a preconfigured dummy value which is not derived from the first sequence number.

Clause 2. The apparatus according to Clause 1, wherein the synchronization failure token comprises an authentication token for synchronization failure.

Clause 3. The apparatus according to Clause 1 or 2, wherein the plural stored nonces comprise ten nonces from ten most recent synchronization failure events.

Clause 4. The apparatus according to Clause 3, wherein the plural stored nonces comprise 100 nonces from 100 most recent synchronization failure events.

Clause 5. The apparatus according to any preceding Clause, wherein the apparatus is configured to store the plural stored nonces in a memory which is comprised in the apparatus.

Clause 6. The apparatus according to any preceding Clause, wherein the apparatus is configured to store the nonce among the plural stored nonces at least in part responsive to the received sequence number not being advanced with respect the first sequence number and the nonce not being identical to any of the plural stored nonces.

Clause 7. The apparatus according to Clause 6, further wherein the apparatus is configured to delete an oldest nonce from among the plural stored nonces in connection with storing the nonce among the plural stored nonces.

Clause 8. The apparatus according to any preceding Clause, wherein the apparatus is configured to perform the storing of the plural stored nonces in a universal subscriber identity module, USIM, comprised in the apparatus.

Clause 9. The apparatus according to any preceding Clause, wherein the communication network is a wireless third generation communication network, a wireless fourth generation communication network or a wireless fifth generation communication network, as defined by the third generation partnership project, 3GPP.

Clause 10. The apparatus according to any preceding Clause, further configured to store, associated with each one of the plural stored nonces, an indication of a location, where the respective nonce was used to send a synchronization failure token.

Clause 11. A method comprising:
receiving, in an apparatus, from a communication network, an authentication request which comprises a nonce and a received sequence number;
checking, whether the received sequence number is advanced with respect to a first sequence number, the first sequence number being from a most recent previous authentication request handled by the apparatus;
checking, responsive to the received sequence number not being advanced with respect the first sequence number, whether the nonce is identical to one from among plural stored nonces, and
sending, responsive to the nonce being identical to the one stored nonce, a response to the authentication request which comprises as a synchronization failure token a preconfigured dummy value which is not derived from the first sequence number.

Clause 12. The method according to Clause 11, wherein the synchronization failure token comprises an authentication token for synchronization failure.

Clause 13. The method according to Clause 11 or 12, wherein the plural stored nonces comprise ten nonces from ten most recent synchronization failure events.

Clause 14. The method according to Clause 13, wherein the plural stored nonces comprise 100 nonces from 100 most recent synchronization failure events.

Clause 15. The method according to any of Clauses 11-14, comprising storing the plural stored nonces in a memory which is comprised in the apparatus.

Clause 16. The method according to any of Clauses 11-15, comprising storing the nonce among the plural stored nonces at least in part responsive to the received sequence number not being advanced with respect the first sequence number and the nonce not being identical to any of the plural stored nonces.

Clause 17. The method according to Clause 16, further comprising deleting an oldest nonce from among the plural stored nonces in connection with storing the nonce among the plural stored nonces.

Clause 18. The method according to any of Clauses 11-17, comprising performing the storing of the plural stored nonces in a universal subscriber identity module, USIM, comprised in the apparatus.

Clause 19. The method according to any of Clauses 11-18, wherein the communication network is a wireless third generation communication network, a wireless fourth generation communication network or a wireless fifth generation communication network as defined by the third generation partnership project, 3GPP.

Clause 20. An apparatus comprising at least one processing core, at least one memory including computer program code, the at least one memory and the computer program code being configured to, with the at least one processing core, cause the apparatus at least to:
send, to a user equipment, an authentication request which comprises a first nonce and a first sequence number;
receive a synchronization failure message as a response to the authentication request, the synchronization failure message comprising as a synchronization failure token a preconfigured dummy value, and
responsive to the synchronization failure token comprising the dummy value, send a new authentication request to the user equipment, the new authentication request comprising a second nonce and a second sequence number, the second nonce being different from the first nonce.

Clause 21. A method, comprising:
sending, to a user equipment, an authentication request which comprises a first nonce and a first sequence number;
receiving a synchronization failure message as a response to the authentication request, the synchronization failure message comprising as a synchronization failure token a preconfigured dummy value, and
responsive to the synchronization failure token comprising the dummy value, sending a new authentication request to the user equipment, the new authentication request comprising a second nonce and a second sequence number, the second nonce being different from the first nonce.

Clause 22. An apparatus comprising means for:
receiving, in an apparatus, from a communication network, an authentication request which comprises a nonce and a received sequence number;
checking, whether the received sequence number is advanced with respect to a first sequence number, the first sequence number being from a most recent previous authentication request handled by the apparatus;
checking, responsive to the received sequence number not being advanced with respect the first sequence number, whether the nonce is identical to one from among plural stored nonces, and
sending, responsive to the nonce being identical to the one stored nonce, a response to the authentication request which comprises as a synchronization failure token a preconfigured dummy value which is not derived from the first sequence number.

Clause 23. An apparatus comprising means for:
sending, to a user equipment, an authentication request which comprises a first nonce and a first sequence number;
receiving a synchronization failure message as a response to the authentication request, the synchronization failure message comprising as a synchronization failure token a preconfigured dummy value, and
responsive to the synchronization failure token comprising the dummy value, sending a new authentication request to the user equipment, the new authentication request comprising a second nonce and a second sequence number, the second nonce being different from the first nonce.

Clause 24. A non-transitory computer readable medium having stored thereon a set of computer readable instructions that, when executed by at least one processor, cause an apparatus to at least perform:
receiving, in an apparatus, from a communication network, an authentication request which comprises a nonce and a received sequence number;
checking, whether the received sequence number is advanced with respect to a first sequence number, the first sequence number being from a most recent previous authentication request handled by the apparatus;
checking, responsive to the received sequence number not being advanced with respect the first sequence number, whether the nonce is identical to one from among plural stored nonces, and
sending, responsive to the nonce being identical to the one stored nonce, a response to the authentication request which comprises as a synchronization failure token a preconfigured dummy value which is not derived from the first sequence number.

Clause 25. A non-transitory computer readable medium having stored thereon a set of computer readable instructions that, when executed by at least one processor, cause an apparatus to at least perform:
sending, to a user equipment, an authentication request which comprises a first nonce and a first sequence number;
receiving a synchronization failure message as a response to the authentication request, the synchronization failure message comprising as a synchronization failure token a preconfigured dummy value, and
responsive to the synchronization failure token comprising the dummy value, sending a new authentication request to the user equipment, the new authentication request comprising a second nonce and a second sequence number, the second nonce being different from the first nonce.

Clause 26. A computer program configured to cause an apparatus to perform at least the following, when run on a computer:
receiving, in an apparatus, from a communication network, an authentication request which comprises a nonce and a received sequence number;
checking, whether the received sequence number is advanced with respect to a first sequence number, the first sequence number being from a most recent previous authentication request handled by the apparatus;
checking, responsive to the received sequence number not being advanced with respect the first sequence number, whether the nonce is identical to one from among plural stored nonces, and
sending, responsive to the nonce being identical to the one stored nonce, a response to the authentication request which comprises as a synchronization failure token a preconfigured dummy value which is not derived from the first sequence number.

Clause 27. A computer program configured to cause an apparatus to perform at least the following, when run on a computer:
sending, to a user equipment, an authentication request which comprises a first nonce and a first sequence number;
receiving a synchronization failure message as a response to the authentication request, the synchronization failure message comprising as a synchronization failure token a preconfigured dummy value, and
responsive to the synchronization failure token comprising the dummy value, sending a new authentication request to the user equipment, the new authentication request comprising a second nonce and a second sequence number, the second nonce being different from the first nonce.

The invention claimed is:

1. An apparatus comprising at least one processing core, at least one memory including computer program code, the at least one memory and the computer program code being configured to, with the at least one processing core, cause the apparatus at least to:
receive, from a communication network, an authentication request which comprises a nonce and a received sequence number;
check, whether the received sequence number is advanced with respect to a first sequence number, the first sequence number being from a most recent previous authentication request handled by the apparatus;
check, responsive to the received sequence number not being advanced with respect the first sequence number, whether the nonce is identical to one from among plural stored nonces, and
send, responsive to the nonce being identical to the one stored nonce, a response to the authentication request which comprises as a synchronization failure token a preconfigured dummy value which is not derived from the first sequence number.

2. The apparatus according to claim 1, wherein the synchronization failure token comprises an authentication token for synchronization failure.

3. The apparatus according to claim 1, wherein the plural stored nonces comprise ten nonces from ten most recent synchronization failure events.

4. The apparatus according to claim 3, wherein the plural stored nonces comprise nonces from most recent synchronization failure events.

5. The apparatus according to claim 1, wherein the apparatus is configured to store the plural stored nonces in a memory which is comprised in the apparatus.

6. The apparatus according to claim 1, wherein the apparatus is configured to store the nonce among the plural stored nonces at least in part responsive to the received sequence number not being advanced with respect the first sequence number and the nonce not being identical to any of the plural stored nonces.

7. The apparatus according to claim 6, further wherein the apparatus is configured to delete an oldest nonce from among the plural stored nonces in connection with storing the nonce among the plural stored nonces.

8. The apparatus according to claim 1, wherein the apparatus is configured to perform the storing of the plural stored nonces in a universal subscriber identity module, USIM, comprised in the apparatus.

9. The apparatus according to claim 1, wherein the communication network is a wireless third generation communication network, a wireless fourth generation communication network or a wireless fifth generation communication network, as defined by the third generation partnership project, 3GPP.

10. The apparatus according to claim 1, further configured to store, associated with each one of the plural stored nonces, an indication of a location, where the respective nonce was used to send a synchronization failure token.

11. A method comprising:
receiving, in an apparatus, from a communication network, an authentication request which comprises a nonce and a received sequence number;
checking, whether the received sequence number is advanced with respect to a first sequence number, the first sequence number being from a most recent previous authentication request handled by the apparatus;
checking, responsive to the received sequence number not being advanced with respect the first sequence number, whether the nonce is identical to one from among plural stored nonces, and
sending, responsive to the nonce being identical to the one stored nonce, a response to the authentication request which comprises as a synchronization failure token a preconfigured dummy value which is not derived from the first sequence number.

12. The method according to claim 11, wherein the synchronization failure token comprises an authentication token for synchronization failure.

13. The method according to claim 11, wherein the plural stored nonces comprise ten nonces from ten most recent synchronization failure events.

14. The method according to claim 13, wherein the plural stored nonces comprise nonces from most recent synchronization failure events.

15. The method according to claim 11, comprising storing the plural stored nonces in a memory which is comprised in the apparatus.

16. The method according to claim 11, comprising storing the nonce among the plural stored nonces at least in part responsive to the received sequence number not being advanced with respect the first sequence number and the nonce not being identical to any of the plural stored nonces.

17. The method according to claim 16, further comprising deleting an oldest nonce from among the plural stored nonces in connection with storing the nonce among the plural stored nonces.

18. The method according to claim 11, comprising performing the storing of the plural stored nonces in a universal subscriber identity module, USIM, comprised in the apparatus.

19. The method according to claim 11, wherein the communication network is a wireless third generation communication network, a wireless fourth generation communication network or a wireless fifth generation communication network as defined by the third generation partnership project, 3GPP.

20. A non-transitory computer readable medium having stored thereon a set of computer readable instructions that, when executed by at least one processor, cause an apparatus to at least perform:
receive, in an apparatus, from a communication network, an authentication request which comprises a nonce and a received sequence number;
check, whether the received sequence number is advanced with respect to a first sequence number, the first sequence number being from a most recent previous authentication request handled by the apparatus;
check, responsive to the received sequence number not being advanced with respect the first sequence number, whether the nonce is identical to one from among plural stored nonces, and
send, responsive to the nonce being identical to the one stored nonce, a response to the authentication request which comprises as a synchronization failure token a preconfigured dummy value which is not derived from the first sequence number.

21. An apparatus according to claim 1, wherein the sequence number being advanced with respect to the first sequence number comprises that a numerical value of the sequence number is incremented with respect to the first sequence number.

* * * * *